United States Patent [19]

Bauer et al.

[11] Patent Number: 5,080,204
[45] Date of Patent: Jan. 14, 1992

[54] FRICTIONAL VIBRATOR DAMPER

[75] Inventors: Hans J. Bauer; Hans-Peter Bauer, both of Altdorf; Dieter Mayer, Sulzbach-Rosenberg; Ludwig Stadelmann, Altdorf, all of Fed. Rep. of Germany

[73] Assignee: Suspa Compart Aktiengesellschaft, Altdorf, Fed. Rep. of Germany

[21] Appl. No.: 653,394

[22] Filed: Feb. 11, 1991

[30] Foreign Application Priority Data

Feb. 9, 1990 [DE] Fed. Rep. of Germany ....... 4003890

[51] Int. Cl.$^5$ ............................................. B60T 7/12
[52] U.S. Cl. ................................... 188/129; 188/381; 68/23.1; 68/24
[58] Field of Search .............. 188/381, 129, 140 A; 68/23.1, 23.3, 24

[56] References Cited

U.S. PATENT DOCUMENTS

| | | | |
|---|---|---|---|
| 4,010,829 | 3/1977 | Naito et al. | 188/278 |
| 4,265,467 | 5/1981 | Aleck | 188/381 |
| 4,729,458 | 3/1988 | Bauer et al. | 188/129 |
| 4,934,493 | 6/1990 | Bauer et al. | 188/129 X |
| 4,946,008 | 8/1990 | Bauer et al. | 188/129 |
| 4,991,412 | 2/1991 | Bauer et al. | 68/23.1 |

FOREIGN PATENT DOCUMENTS

| | | | |
|---|---|---|---|
| 236204 | 2/1987 | European Pat. Off. | |
| 277788 | 8/1988 | European Pat. Off. | |
| 1136974 | 9/1962 | Fed. Rep. of Germany | 68/23.1 |
| 1181133 | 11/1964 | Fed. Rep. of Germany | 68/23.1 |
| 2520064 | 11/1976 | Fed. Rep. of Germany | |
| 1041305 | 11/1981 | Fed. Rep. of Germany | |
| 3026915 | 11/1981 | Fed. Rep. of Germany | |
| 0329338 | 2/1972 | U.S.S.R. | 188/381 |

Primary Examiner—Joseph F. Peters, Jr.
Assistant Examiner—Christopher P Ellis
Attorney, Agent, or Firm—Browdy and Neimark

[57] ABSTRACT

A frictional vibration damper, in particular for washing machines with an oscillatory support of a washer unit has an approximately tube-shaped housing and a tappet displaceable in it. An articulation element is provided at the outer end of each the housing and the tappet. Further, a friction piston bearing with a friction coating on the internal wall of the housing is formed on the tappet, which friction piston is extendable by means of a linearly operating servomotor. In order to achieve high safety in operation at little expenditure, the servomotor is arranged in the tappet. It is formed by an electrically heatable thermoactuator element having a housing with a piston which changes its position relative to the housing upon heating. The piston of the servomotor directly bears against an expansion member serving to expand the friction piston.

12 Claims, 3 Drawing Sheets

FRICTIONAL VIBRATOR DAMPER

BACKGROUND OF THE INVENTION

The invention relates to a frictional vibration damper, in particular for washing machines with an oscillartory support of the washer unit, with an approximately tube-shaped housing and with a tappet displaceable in it, an articulation element being provided at the outer end of both, the housing and the tappet, and a friction piston bearing with a friction coating on the internal wall of the housing being formed on the tappet, which friction piston is extendable by means of a linearly operating servomotor.

BACKGROUND OF THE INVENTION

Frictional dampers of the generic kind known from DE 30 16 915 A1 are preferably used in washing machines, of which the washer unit preferably having a horizontal drum axis is supported to a great extent freely oscillatory. The vibration absorption is then made by means of the vibration dampers of the generic kind. A basic problem of the washing machines, which are drivable, on the one hand, at a low, subcritical rotational washing speed and, on the other hand, at a high, supercritical rotational spinning speed, consists in that the damping forces generated by the vibration damper remain approximately constant while the rotational speed increases. The required damping forces, however, increase while the rotational speed increases, until the so-called critical rotational speed has been reached, while the required damping forces strongly decrease after the critical rotational speed has been exceeded and then asymptoticly approach a constant, system-dependent value. In these ranges of high rotational speeds too high damping forces may lead to a coupling between the vibrating washer unit and the machine stand with the result that the latter starts jumping. Further, the mechanical stress of the support gets very high so that fatigue fractures may result.

So as to eliminate this problem the known oscillatory support has an unbalance sensor sensing for example the rotational speed of the drum of the washer unit. This triggers a control element outside the vibration damper, which control element in turn more or less expands the friction piston by means of a rod, a bottom draw or the like, whereby the damping characteristic of the vibration damper is modified. This principle is very advantageous, but extremely expensive.

SUMMARY OF THE INVENTION

It is the object of the invention to embody a vibration damper of the generic type such that while maintaining the capacity of simple modification of its damping characteristic the vibration damper is a largely independent constructional component of little expenditure.

According to the invention this object is achieved by the servomotor being arranged in the tappet. By arranging the servomotor in the tappet of the frictional damper the expansion of the friction piston and thus the damping characteristic is directly modified. No expensive transfers from outside are necessary; only an electric trigger line is necessary. When the servomotor is formed by an electrically heatable thermoactuator element having an electric heating and a housing with a piston, which changes its position relative to the housing upon heating, this reflects a particularly suitable servomotor by which high control forces can be generated given sufficient control paths. Such servomotors do not have any mechanical wearing parts, thus expecting a correspondingly long service life while being of extremely little weight. When the extension means comprises an expansion member serving to expand the friction piston and when the piston of the servomotor directly bears against said expansion member, this has the consequence that a direct actuation of the expansion member is possible.

In the development according to which the servomotor is arranged adjacent to the friction piston in the tappet, a transfer member is no longer necessary between the servomotor and the expansion member. Something of this kind is necessary in the development according to which the servomotor is arranged adjacent to the articulation element of the tappet, but then the servomotor is in a vicinity of the tappet which carries out no more movements almost, since the inserting of such vibration dampers in washing machines is always effected in such a way that the tappet is articulated on the machine stand. The area in the vicinity of the articulating element of the tappet therefore only makes rotational vibrations of very little amplitude. Due to the great forces that the servomotor chosen according to the invention may exercise it needs a good support in the tappet as provided by the servomotor being arranged in a recess of the tappet and being supported radially in said recess with regard to an axis of said tappet and axially in the direction of said axis towards the second articulation element. When the servomotor is arranged adjacent to the articulation element of the tappet and when the expansion member is provided with an operating rod bearing against the piston, and when a prestressed compression spring is provided, which bears with a first end against an abutment in the tappet and with a second end against the expansion member and which works against a displacing force of the piston, and when the fircton piston is provided with an expansion sleeve to be expanded by means of the expansion member and when the friction coating is arranged on said expansion sleeve, and when the friction piston is provided with expansion jaws to be expanded by means of the expansion member and when the friction coating is arranged on said expansion jaws, this reflects particularly advantageous embodiments of the frictional piston with regard to the servomotor according to the invention. The measures according to which an electric line for the supply of said electric heating of said servomotor with current is guided adjacent to the second articulation element away from the tappet and according to which the electric line is secured to the tappet as far as in the proximity of the second articulation element, ensure that the electric lines supplying the heating of the servomotor are exposed to extremely little dynamic load only.

Further details of the invention will become apparent from the ensuing description of exemplary embodiments taken in conjunction with the drawings.

DESCRIPTION OF THE PREFERRED EMBODIMENTS

Figure 1:
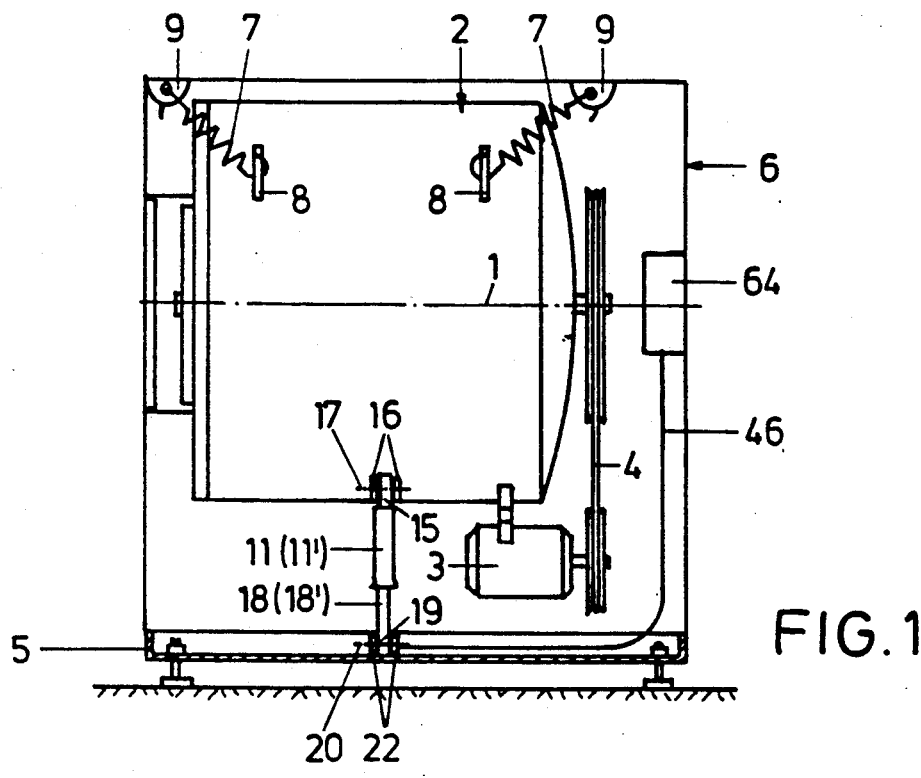
FIG. 1 is a diagrammatic representation of a drum washing machine in a side view.
Figure 2:
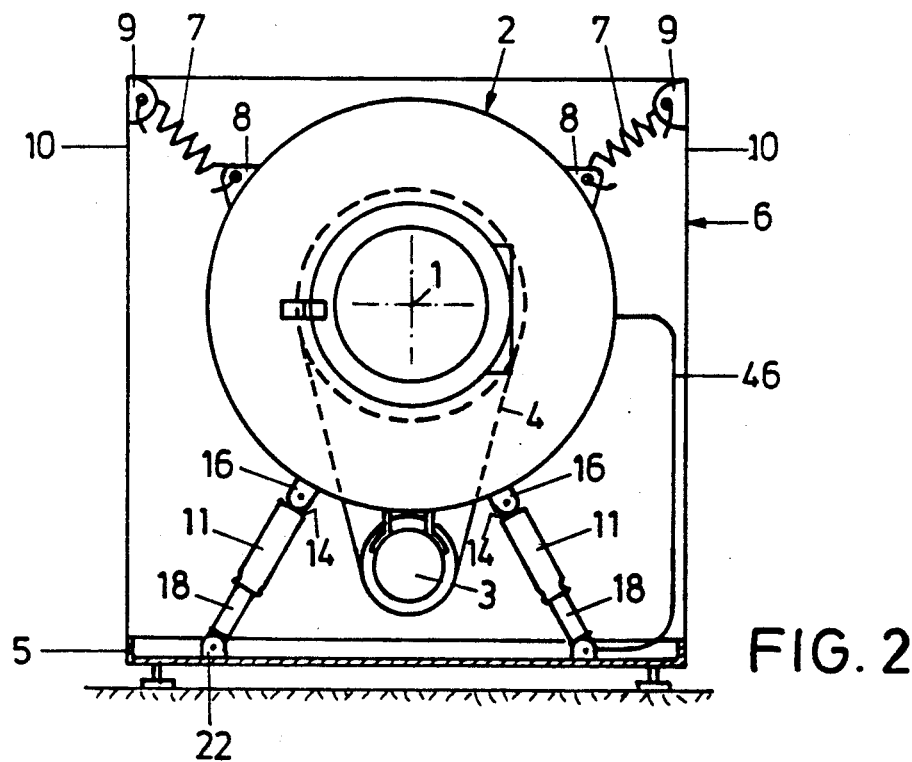
FIG. 2 is a front view of the drum washing machine according to FIG. 1.

A drum washing machine with a horizontal drum axis 1 has an oscillatory washer unit 2 with a drive motor S driving the washing drum not shown in detail by way of a belt drive 4. Further components connected with the washer unit 2, such as a transmission, are not shown for reasons of simplicity. The oscillatory washer unit 2 is suspended by means of screw tension springs 7 on a washing machine housing 6 supported on a machine stand 5 formed by a main frame. The tension springs 7 are on the one hand secured to loops 8 arranged in the upper area of the washer unit 2. On the other hand, they are suspended on loops 9 provided on side walls 10 of the housing 6.

Instead of the washer unit 2 being suspended on tension springs 7, a known support of the washer unit 2 may be provided by way of so-called telescopic spring struts on the machine stand 5, as known from EP-PS 0 108 217 (corresponding to U.S. Ser. No. 539 594). It is of decisive importance that the washer unit 2 is suspended or supported freely oscillatory.

Further, vibration dampers 11 or 11', respectively, are arranged between the washer unit 2 and the machine stand 5, which are frictional dampers to be described in more detail in the following.

In the two examples of embodiment specified in the following the vibration damper 11 or 11', respectively, has a housing 12. The housing 12 essentially consists of a cylindrical tube 13 closed at one end by means of a bottom 14. On the outside of the bottom 14 an articulated bush 15 is provided as an articulating element, by means of which the vibration damper 11 or 11' is secured to a corresponding bearing 16 on the washer unit 2 in such a way that the vibration damper 11 or 11' is pivotable relative to the washer unit 2 about a pivot axis 17 extending parallel to the drum axis 1.

Each vibration damper 11 or 11' further has a tappet 18 or 18' having in like manner at its outer end an articulated bush 19, of which the pivot axis 20 in the same way as the pivot axis 17 is perpendicular to the central longitudinal axis 21 of each vibration damper 11 or 11'. By this articulated bush 19 the vibration damper 11 or 11' is pivotably seized in a bearing 22 arranged on the machine stand 5 in such a manner that the pivot axis 20 also extends parallel to the drum axis 1.

Since the tappets 18 and 18', respectively, of the two examples of embodiment shown differ in construction they are individually specified in the following.

In the example of embodiment according to FIGS. 3 to 6 the tappet 18 has an essentially cylindrical tube 23, which is reinforced by some external ribs 24 and at the outer end of which is formed an articulated bush 19. The tappet 18 is injection-moulded in one piece of plastic material.

A friction piston 25 is provided at the inner end of the tappet 18 located in the housing 12. This friction piston has a counter-holder flange 26, which faces towards the articulated bush 19 which is annular cylindrical in its outer circumference and approximately extends to the internal wall 27 of the housing 12 with a certain clearance towards the internal wall, however. The friction piston 25 further has three partial annular-cylinder webs 28, which extend concentrically to the axis 21 and to the end of which a further counter-holder flange 29 is provided equally extending into the direct proximity of the internal wall 27 of the housing 12. The two counter-holder flanges 26 and 29 and the partial annular-cylinder webs 28 are also shaped integrally with the tappet 18. Recesses 30 are provided between the webs 28.

Figure 5:
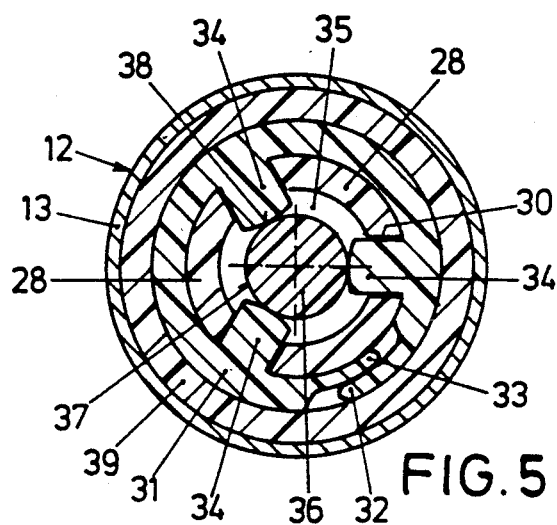
FIG. 5 is a cross-section through FIG. 3 along the section line V—V in FIG. 3.
Figure 6:
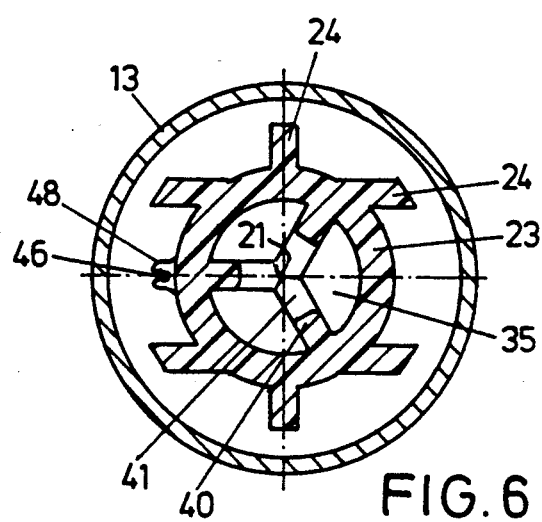
FIG. 6 is a cross-section through FIG. 3 along the section line VI—VI in FIG. 3.

An expandable expansion sleeve 31 is arranged between the two counter-holder flanges 26, 29 and on the webs 28, which expansion sleeve 31—as can be seen from FIG. 5—has two wall sections 32, 33, which overlap each other tangentially to the axis 21, which are not connected with each other, and which thus may be displaced relative to each other tangentially to the axis 21. The expansion sleeve 31 is further provided with three expansion webs 34, which extend radially to the axis 21 and project through the recesses 30 into the internal chamber 35 of the tappet 18. It forms a separate constructional component relative to the tappet 18.

Figure 3:
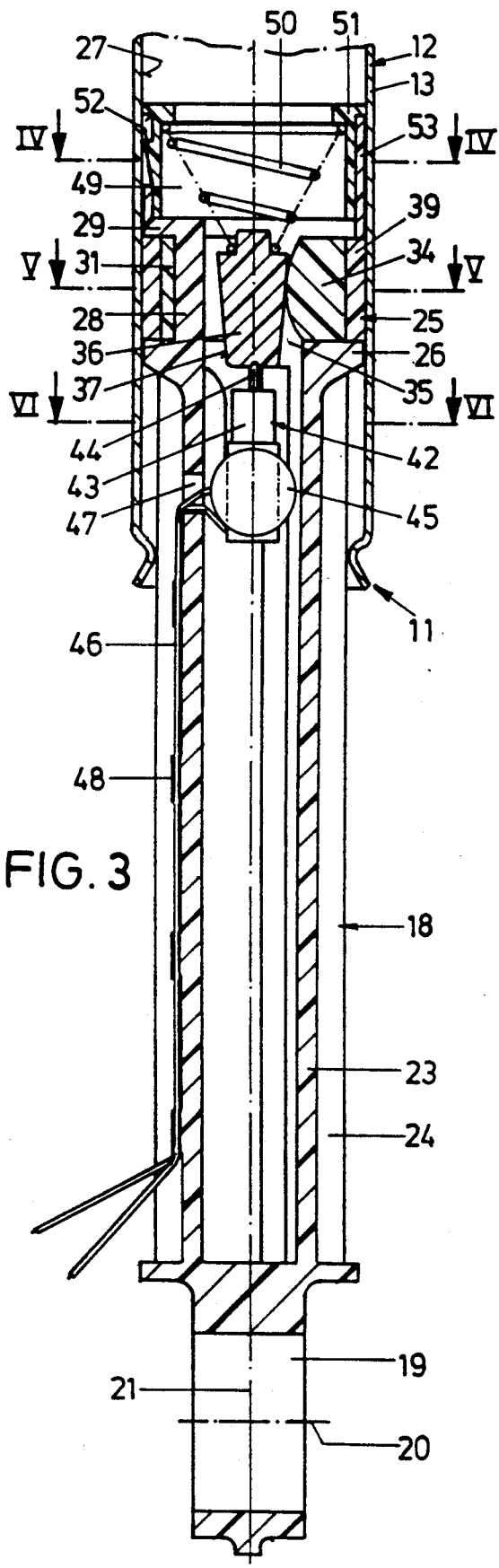
FIG. 3 is a partial longitudinal section of an embodiment of a vibration damper.
Figure 4:
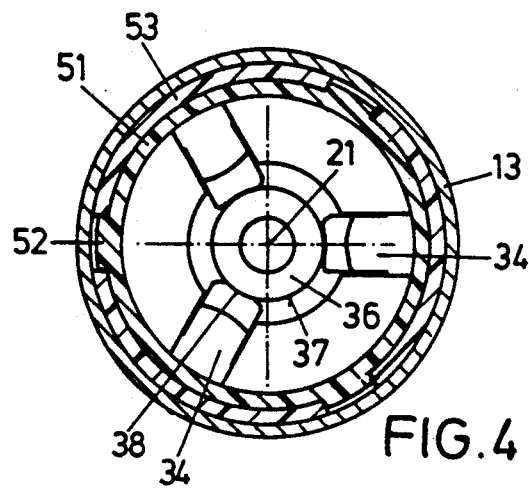
FIG. 4 is a cross-section through FIG. 3 along the section line IV—IV in FIG. 3.

An expansion wedge 36 is arranged between these expansion webs 34 having the form of a truncated cone tapering towards the articulated bush 19 and, with its frusto-conical or conical external surface 37, bearing against the expansion surfaces 38 facing it of the expansion webs 34, as can in particular be taken from FIG. 3 and 5. A friction coating 39 is provided on the expansion sleeve 31 and consists of a cellular, elastic foam material, such as a polyurethane foam. It may be in the form of an annular cylindrical sleeve or only be slipped around the expansion sleeve as a strip. In the direction towards the axis 21 it bears against the two counter-holder flanges 20, 29.

In the internal chamber 35 of the tube 23 of the tappet 18 radially extending webs 40 are integrally formed with the tube 23 and have a cylindrical recess 41 extending concentrically to the axis 21 formed between them adjacent to the expansion wedge 36. A so-called thermoactuator element serving as a servomotor 42 is arranged in this recess 41 facing the expansion wedge 36. It has an essentially cylindrical housing 43 radially supported in the recess 41 and in particular axially supported in the direction towards the articulated bush 19. The housing 43 is filled with a wax-like material strongly expanding upon heating and pushing a piston 44 out of the housing 43 or pulling this piston 44 into the housing 43 upon cooling down of the thermoactuator. Such thermoactuator elements are known and commercially available and are supplied for example by ELTEK Spa of Casale, Italy. A electric heating 45 is provided on the housing 43 and can be supplied with electric energy via two lines 46. These lines 46 are guided outwards through an opening 47 provided in the tube 23 and simultaneously as a vent. On the outer wall the lines 46 are elastically clamped in clamps 48 formed in one piece with the tube 23 and are guided into the proximity of the articulated bush 19. When the heating 45 is heated by a corresponding supply of electric energy and when thus the thermoactuator located in the housing 43 is heated, then the piston 44 comes out of the housing 43 and displaces the expansion wedge 36 in the direction towards the internal chamber 49 of the housing 12. FIG. 3 shows the position of rest of the piston 44 and of the expansion wedge 36, in which position the heating 45 is not supplied with current.

On its side opposite the servomotor 42 the expansion wedge 36 bears against a prestressed conical compression spring 50, which, in turn, bears against a sleeve-like abutment 51, which can be locked into place elastically by means of projection noses 52 in the end section 53 of the tappet 18 extending from the tube 23 beyond the friction piston 25. The compression spring 50 moves the expansion wedge 36 towards the servomotor 42, so that the expansion sleeve 31 and thus also the friction coating 39 are expanded radially. In this position a maximum friction force is produced between the friction coating 39 and the internal wall 27 of the housing 12, when the tappet 18 is displaced relative to the housing 12, i.e. when the washer unit 2 exercises oscillatory movements relative to the machine stand 5. If, however, the electric heating 45 is provided with current, the piston 44 displaces the expansion wedge 36 in an opposite direction against the force of the prestressed compression spring 50, whereby the expansion of the expansion sleeve 31 and thus the friction coating 39 is reduced, i.e. the frictional force of the friction coating 39 on the internal wall 27 of the housing 12 is reduced.

Figure 7:
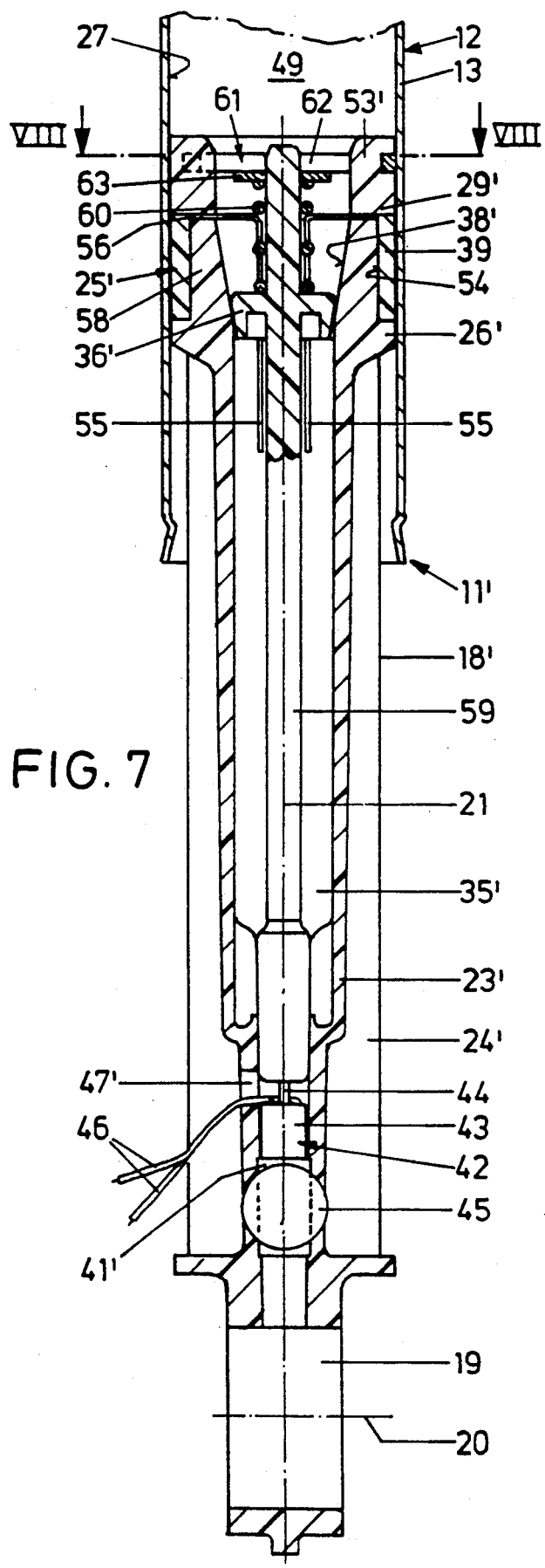
FIG. 7 is a partial longitudinal section of a second embodiment of a vibration damper.
Figure 9:
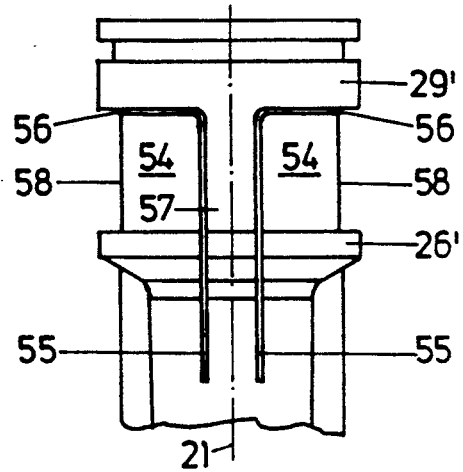
FIG. 9 is a partial top view of the friction piston of the vibration damper according to FIG. 7, the abutment and the friction coating not being mounted.
Figure 8:
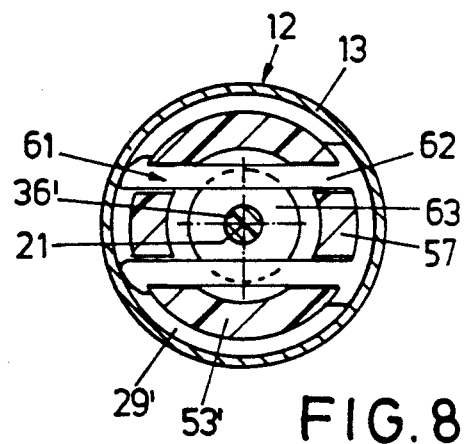
FIG. 8 is a cross-section through FIG. 7 along the section line VIII—VIII in FIG. 7.

The vibration damper 11' according to FIGS. 7 to 9 also has a tube 23' reinforced by ribs 24', at the outer end of which the articulated bush 19 is formed integrally.

At its end located in the internal chamber 49 of the housing 12 the tappet 18' is provided with a friction piston 25' substantially integrally formed with the tappet 18'. It has an essentially annular cylindrical bearing surface 54 for a friction coating 39. A counter-holder flange 26' or 29', respectively, is axially adjacent to this bearing surface 54.

The tappet 18' is provided with slits 55 on sides facing each other diametrically in the vicinity of the friction piston 25'. Furthermore, two circumferential slits 56 lying opposite each other are provided and are formed between the bearing surface 54 and the counter-holder flange 29'. Due to the arrangement and the formation of these slits 55, 56 two webs 57 are created, which are diametrically opposite each other and which bear the counter-holder flange 29' facing the internal chamber 49 of the housing 12. These webs 57 are located in the cylindrical bearing surface 54 for the friction bearing 39—as shows in particular FIG. 8. As a result of this design expansion jaws 58 for the friction coating 39 are formed, which are not directly connected with the counter-holder flange 29' and which can be pivoted radially to the axis 21. On the inner sides of these expansion jaws 58 expansion surfaces 38' are provided tapering conically or frusto-conically towards the articulated bush 19. An expansion wedge 36' bears against these expansion surfaces 38' and is provided with an operating rod 59 extending concentrically to the axis 21. This operating rod 59 bears against a servomotor 42 which, directly adjacent to the articulated bush 19, is radially firmly supported in an inner chamber 35' of the tappet 18' and which is axially firmly supported in a direction towards the articulated bush 19. The electric lines 46 are guided outwards through an opening 47' also simultaneously serving as a vent.

On the side facing away from the servomotor 42 the expansion wedge 36' bears against a prestressed screw compression spring 60 bearing in turn against an abutment 61 secured in the associated end section 53' of the tappet 18'. This abutment 61 is essentially formed by a locking element 62 movable at right angles to the axis 21 into the end section 53' and elastically lockable. A back-up ring 63 is arranged between this locking element 62 and the compression spring 60. Here, too, the expansion of the friction coating 39 is effected by moving the expansion wedge 36' through the compression spring 60 towards the servomotor 42, while the reduction of the expansion of the friction coating 39 and thus the reduction of the frictional force between the friction coating 39 and the internal wall 27 of the housing 12 is produced by a current supply to the heating 45 of the servomotor 42 and by a thus cause exit of the piston 44 out of its housing 43.

A rotational speed sensor 64 serves to trigger the servomotor 42; when a predetermined rotational speed, namely the critical rotational speed of the whole vibration system, has been exceeded, the sensor 64 triggers a current supply to the electric heatings 45 with the result that the friction between the friction coating 39 and the internal wall 27 of the housing 12 is reduced in the manner already described. The damping effect of the vibration dampers 11 or 11', respectively, is thus reduced.

What is claimed is:

1. A frictional vibration damper, in particular for washing machines with an oscillatory support of a washer unit (2) comprising:
   an approximately tube-shaped housing (12);
   a tappet (18, 18') displaceable in said housing (12);
   a first articulation element (15) being provided at an outer end of the housing (12);
   a second articulation element (19) being provided at an outer end of the tappet (18, 18');
   a friction piston (25, 25') being formed on the tappet (18, 18') and bearing with a friction coating (39) on an internal wall (27) of the housing (12) and being provided with extension means for said friction piston (25, 25'); and
   a linearly operating servomotor (42) operationally connected to said extension means of said friction piston (25, 25');
   wherein said servomotor (42) is arranged in the tappet (18, 18').

2. A vibration damper according to claim 1, wherein said servomotor (42) is formed by an electrically heatable thermoactuator element having an electric heating (45) and a housing (43) with a piston (44), which changes its position relative to the housing (43) upon heating.

3. A vibration damper according to claim 2, wherein said extension means comprises an expansion member (36, 36') serving to expand the friction piston (25, 25') and wherein the piston (44) of said servomotor (42) directly bears against said expansion member (36, 36').

4. A vibration damper according to claim 1, wherein said servomotor (42) is arranged adjacent to the friction piston (25) in the tappet (18).

5. A vibration damper according to claim 1, wherein said servomotor (42) is arranged adjacent to the articulation element (19) of the tappet (18').

6. A vibration damper according to claim 1, wherein said servomotor (42) is arranged in a recess (41, 41') of the tappet (18, 18') and is supported radially in said recess (41, 41') with regard to an axis (21) of said tappet (18, 18') and axially in the direction of said axis (21) towards said second articulation element (19).

7. A vibration damper according to claim 3, wherein said servomotor (42) is arranged adjacent to the articulation element (19) of the tappet (18') and wherein the expansion member (36') is provided with an operating rod (59) bearing against the piston (44).

8. A vibration damper according to claim 3, wherein a prestressed compression spring (50, 60) is provided, which bears with a first end against an abutment in the tappet (18, 18') and with a second end against the expansion member (36, 36') and which works against a displacing force of the piston (44).

9. A vibration damper according to claim 3, wherein the friction piston is provided with an expansion sleeve (31) to be expanded by means of the expansion member (36) and wherein the friction coating (39) is arranged on said expansion sleeve (31).

10. A vibration damper according to claim 3, wherein the friction piston is provided with expansion jaws (58) to be expanded by means of the expansion member (36') and wherein the friction coating (39) is arranged on said expansion jaws (58).

11. A vibration damper according to claim 2, wherein an electric line (46) for the supply of said electric heating (45) of said servomotor (42) with current is guided adjacent to said second articulation element (19) away from the tappet (18').

12. A vibration damper according to claim 11, wherein the electric line (46) is secured to the tappet (18) as far as in the proximity of said second articulation element (19).

* * * * *